United States Patent
Becker

[11] Patent Number: 5,859,104
[45] Date of Patent: Jan. 12, 1999

[54] RETARDING DEPOLYMERIZATION OF POLY(METHYL METHACRYLATE) GRAFTED ONTO A PROPYLENE POLYMER

[75] Inventor: Ronald F. Becker, Newark, Del.

[73] Assignee: Montell North America Inc., Wilmington, Del.

[21] Appl. No.: 769,569

[22] Filed: Dec. 19, 1996

[51] Int. Cl.[6] ..................................................... C08K 5/17
[52] U.S. Cl. ............................................................. 524/236
[58] Field of Search .............................................. 524/236

[56] References Cited

U.S. PATENT DOCUMENTS

| | | | |
|---|---|---|---|
| 4,168,278 | 9/1979 | Smith | 260/561 |
| 4,668,721 | 5/1987 | Seltzer et al. | 524/95 |
| 4,876,300 | 10/1989 | Seltzer et al. | 524/100 |
| 5,045,583 | 9/1991 | Odorisio et al. | 524/236 |
| 5,140,074 | 8/1992 | DeNicola et al. | 525/263 |
| 5,286,791 | 2/1994 | DeNicola et al. | 525/71 |
| 5,411,994 | 5/1995 | Galli et al. | 521/50.5 |

FOREIGN PATENT DOCUMENTS

| | | |
|---|---|---|
| 138767 | 4/1985 | European Pat. Off. . |
| 323409 | 7/1989 | European Pat. Off. . |
| 726289 | 8/1996 | European Pat. Off. . |

*Primary Examiner*—Peter D. Mulcahy

[57] ABSTRACT

Depolymerization during melt processing of poly(methyl methacrylate) that is grafted onto a backbone of propylene polymer material is retarded by adding 0.025 parts to 5.0 parts of a hydroxylamine compound per hundred parts of the graft copolymer. The methyl methacrylate can be copolymerized with another monomer such as methylacrylate.

13 Claims, No Drawings

RETARDING DEPOLYMERIZATION OF POLY(METHYL METHACRYLATE) GRAFTED ONTO A PROPYLENE POLYMER

FIELD OF THE INVENTION

This invention relates to a method for retarding the depolymerization of poly(methyl methacrylate) (PMMA) during melt processing of a graft copolymer prepared by graft polymerizing (a) methyl methacrylate (MMA) or (b) a copolymer of methyl methacrylate and one or more comonomers onto a backbone of propylene polymer material so that side chains of PMMA or MMA copolymers are formed.

BACKGROUND OF THE INVENTION

When methyl methacrylate is graft polymerized onto a backbone of propylene polymer material, the product contains a certain amount of free monomer. When the resulting graft copolymer is subjected to melt processing, e.g., extrusion and/or molding, depolymerization occurs and additional monomer is formed. The free monomer in the graft copolymer can lead to surface irregularities known as "splaying" and can produce an odor in the finished product. The conventional method for limiting depolymerization is to copolymerize the methyl methacrylate with a monomer that acts as a chain stopper during the depolymerization reaction, e.g., methyl acrylate, although this method does not eliminate depolymerization entirely.

European patent application 726,289 discloses the addition of compounds containing a =N—O group, e.g., a 2,2,6,6-tetramethyl-1-piperidinyloxy group, to a polymer to inhibit undesirable reactions during heating. e.g., to inhibit depolymerization of polystyrene or poly(methyl methacrylate) during thermal processing, or to inhibit crosslinking of unsaturated polymers such as polybutadiene or butadiene-styrene copolymers during thermal grafting with compounds such as methacrylic acid.

U.S. Pat. No. 4,668,721 discloses the use of hydroxylamine derivatives to stabilize polyolefins against degradation or discoloration after high temperature extrusion, exposure to the combustion products of natural gas or to gamma irradiation, or upon storage for extended periods. U.S. Pat. No. 4,876,300 discloses the use of long chain N, N-dialkylhydroxylamines as process stabilizers for polyolefins that are processed at elevated temperatures.

SUMMARY OF THE INVENTION

The process of this invention for retarding the depolymerization of poly(methyl methacylate) that has been graft polymerized onto a backbone of propylene polymer material comprises mixing about 0.025 to about 5.0 parts of a hydroxylamine compound having the formula $T_1T_2NOH$, where $T_1$ is a 1 to 36 carbon alkyl group, a 5 to 12 carbon cycloalkyl group, a 7 to 9 carbon aralkyl group, or the aralkyl group substituted by a 1 to 4 carbon alkyl group or by one or two halogen atoms and $T_2$ is hydrogen or has the same meaning as $T_1$, per hundred parts of a graft copolymer comprising a backbone of a propylene polymer material having graft polymerized thereto poly(methyl methacrylate) or a copolymer of methyl methacrylate and at least one other monomer, wherein the total amount of polymerized monomers is about 20 parts to about 120 parts by weight per hundred parts of the propylene polymer material, and the comonomer, when present, is present in an amount up to 20 mol % of the total polymerized monomers.

The use of the hydroxylamine additive makes it possible to reduce the monomer content and odor at a given processing temperature, or to carry out melt processing at a higher temperature, i.e., broaden the operating window, without increasing the monomer content or odor of the final product.

DETAILED DESCRIPTION OF THE INVENTION

The propylene polymer material that is used as the backbone of the graft copolymer of this invention can be (a) a homopolymer of propylene;
(b) a random copolymer of propylene and an olefin selected from the group consisting of ethylene and $C_4$–$C_{10}$ α-olefins, provided that when the olefin is ethylene, the maximum polymerized ethylene content is about 10%, preferably about 4%, by weight, and when the olefin is a $C_4$–$C_{10}$ α-olefin, the maximum polymerized content thereof is about 20%, preferably about 16%, by weight;
(c) a random terpolymer of propylene and an olefin selected from the group consisting of ethylene and $C_4$–$C_8$ α-olefins, provided that the maximum polymerized $C_4$–$C_8$ α-olefin content is about 20%, preferably about 16%, by weight, and, when ethylene is one of the olefins, the maximum polymerized ethylene content is about 5%, preferably about 4%, by weight;
(d) an olefin polymer composition consisting essentially of:
(i) from 10% to 50% of a propylene homopolymer having an isotactic index preferably of 85% to 98%, or a copolymer selected from the group consisting of (a) propylene and ethylene, (b) propylene, ethylene and a $CH_2$=CHR α-olefin, where R is a $C_{2-8}$ straight or branched alkyl group, and (c) propylene and an α-olefin as defined above in (i)(b),
(ii) from 5% to 20% of a semi-crystalline, essentially linear copolymer fraction having a crystallinity of about 20% to 60%, by differential scanning calorimetry (DSC), wherein the copolymer is selected from the group consisting of (a) ethylene and propylene containing over 55% ethylene; (b) ethylene, propylene, and an α-olefin as defined above in (i)(b), containing from 1% to 10% of the α-olefin and over 55% up to 98% of both ethylene and α-olefin, and (c) ethylene and an α-olefin as defined in (i)(b), containing over 55% up to 98% of the α-olefin, which copolymer is insoluble in xylene at room or ambient temperature, and
(iii) from 40% to 80% of a copolymer fraction selected from the group consisting of a copolymer of (a) ethylene and propylene wherein the copolymer contains from 20% to less than 40% ethylene; (b) ethylene, propylene, and an α-olefin as defined in (i)(b), wherein the α-olefin is present in an amount of from 1% to 10%, and the amount of ethylene and α-olefin present is from 20% to less than 40%; and (c) ethylene and an α-olefin as defined in (i)(b), containing from 20% to less than 40% of the α-olefin, and optionally with 0.5 to 10% of a diene, the copolymer fraction being soluble in xylene at ambient temperature, and having an intrinsic viscosity of from 1.7 to 3.0 dl/g, wherein the total amount of (ii) and (iii) fractions based on the total olefin polymer composition is from about 65% to 80%, the weight ratio of (ii)/(iii) is from 0.1 to about 0.3, and the total content of ethylene or $C_{4-8}$ α-olefin or combination thereof in (ii)+(iii) is less than 50%, and
(e) a thermoplastic olefin consisting essentially of:
(i) from 10% to 60% of a propylene homopolymer having an isotactic index greater than 90, or a crystalline propylene copolymer with ethylene and/or a $C_{4-8}$ α-olefin having a propylene content greater than 85% and an isotactic index of greater than 85%;
(ii) from 30% to 60% of an amorphous ethylene/propylene copolymer fraction, optionally containing 0.5% to 10% of a diene, which is xylene soluble at room temperature, and contains from 40% to 70% ethylene; and (iii) from 8% to 40% of a semi-crystalline ethylene/propylene copolymer that is xylene insoluble at room temperature.

Room or ambient temperature is ~25° C.

The $C_{4-10}$ α-olefin useful in the preparation of propylene polymer materials (d) and (e) include, for example, butene-1; pentene-1; hexene-1; 4-methyl-1-pentene, and octene.

The diene, when present, is typically a butadiene; 1,4-hexadiene; 1,5-hexadiene; or ethylidenenorbornene.

Propylene polymer materials (d) and (e) can be prepared by polymerization in at least two stages, where in the first stage the propylene, or propylene and ethylene or α-olefin, or propylene, ethylene and the α-olefin are polymerized to form component (i) of (d) or (e), and in the following stages the mixtures of ethylene and propylene or the α-olefin, or ethylene, propylene and the α-olefin, and optionally a diene, are polymerized to form components (ii) and (iii) of (d) or (e).

The polymerization can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. This is the preferred method.

The preparation of propylene polymer materials (d) and (e) is described in more detail in U.S. Pat. No. 5,409,992, the process of which is incorporated herein by reference.

Propylene homopolymer is the preferred propylene polymer backbone material.

The monomers that form grafted polymers or copolymers on the backbone of propylene polymer material are methyl methacrylate or a mixture of methyl methacrylate and one or more monomers that act as chain stoppers during the depolymerization reaction. Suitable monomers include, for example, methyl acrylate, ethyl acrylate, cyclohexyl acrylate, styrene, butyl acrylate, 2-ethylhexyl acrylate, acrylic acid, methacrylic acid, and acrylonitrile. During the graft polymerization, the monomers also polymerize to form a certain amount of free or ungrafted polymer or copolymer. Any reference to "polymerized monomers" in this specification is meant to include both grafted and ungrafted polymerized monomers. The polymerized monomers comprise from about 10 parts to about 120 parts per hundred parts of the propylene polymer material, preferably about 30 to about 100 pph. The morphology of the graft copolymer is such that the propylene polymer material is the continuous or matrix phase, and the PMMA or methyl methacrylate copolymer, both grafted and ungrafted, are a dispersed phase. When a comonomer is used for the graft polymerization, the comonomer comprises up to 20 mol %, preferably about 2 mol % to about 10 mol %, of the total monomers.

The graft copolymer can be made according to any one of various methods. One of these methods involves forming active grafting sites on the propylene polymer material either in the presence of the grafting monomers, or followed by treatment with the monomers. The grafting sites can be produced by treatment with a peroxide or other chemical compound that is a free radical polymerization initiator, or by irradiation with high energy ionizing radiation. The free radicals produced in the polymer as a result of the chemical or irradiation treatment form the active grafting sites on the polymer and initiate the polymerization of the monomers at these sites. Graft copolymers produced by peroxide-initiated grafting methods are preferred.

In the peroxide-initiated method, the propylene polymer material is treated at a temperature of about 60° C. to about 125° C., preferably about 80° to about 120° C., with about 0.1 to about 6, preferably about 0.2 to about 3.0, pph (parts by weight per 100 parts by weight of the propylene polymer material) of an initiator having a decomposition half-life of about 1 to about 240, preferably about 5 to about 100, and more preferably about 10 to about 40, minutes at the temperature employed. Organic peroxides, and especially those that generate alkoxy radicals, constitute the preferred class of initiators. These include acyl peroxides, such as benzoyl and dibenzoyl peroxides; dialkyl and aralkyl peroxides, such as di-tert-butyl peroxide, dicumyl peroxide, cumyl butyl peroxide, 1,1-tert-butylperoxy-3,5,5-trimethylcylclohexane, 2,5-dimethyl-2,5-di-tert-butylperoxyhexane, and bis(alpha-tert-butylperoxyisopropylbenzene); peroxy esters, such as tert-butylperoxy pivalate, tert-butyl perbenzoate, 2,5-dimethylhexyl-2,5-di(perbenzoate), tert-butyl di(perphthalate), tert-butylperoxy-2-ethyl hexanoate; 1,1-dimethyl-3-hydroxybutylperoxy-2-ethyl hexanoate; and peroxy carbonates, such as di(2-ethylhexyl)peroxy dicarbonate, di(n-propyl)peroxy dicarbonate, and di(4-tert-butylcyclohexyl)peroxy dicarbonate.

Over a period that coincides with, or follows, the period of initiator treatment, with or without overlap, the propylene polymer material is treated with about 10% to about 50% by weight of the grafting monomers, based on the total weight of propylene polymer material and grafting monomers used, at a rate of addition that does not exceed about 4.5, preferably about 3.0, and more preferably about 2.0, pph per minute at any monomer addition level. If the monomers are added after the initiator addition period, preferably no more than about 2.5 initiator half-lives separate the intitiator and monomer addition periods.

After the grafting period, any unreacted monomers are removed from the resultant grafted propylene polymer material, and any unreacted initiator is decomposed and any residual free radicals are deactivated, preferably by heating, generally at a temperature of at least 100° C. for at least 5 minutes, preferably at least 120° C. for at least 20 minutes. A substantially nonoxidizing environment is maintained throughout the process.

The expression "substantially nonoxidizing", when used herein to describe the environment or atmosphere to which the olefin polymer material is exposed means an environment in which the active oxygen concentration, i.e., the concentration of oxygen in a form that will react with the free radicals in the irradiated material, is less than about 15%, preferably less than about 5%, and more preferably less than about 1%, by volume. The most preferred concentration of active oxygen is 0.004% or lower by volume. Within these limits, the nonoxidizing atmosphere can be any gas, or mixture of gases, that is oxidatively inert toward the free radicals in the olefin polymer material, e.g., nitrogen, argon, helium, and carbon dioxide.

In a method wherein the active grafting sites are produced by irradiation, the propylene polymer material is irradiated at a temperature in the range of about 10° C. to about 85° C. with high energy ionizing radiation, and the irradiated polymer material is treated at a temperature of about 10° C. to about 100° C., preferably about 10° C. to about 70° C., and more preferably about 10° C. to about 50° C., for at least about 3 minutes, preferably at least about 10 minutes in a semi-batch process, with about 10% to about 70% by weight of the grafting monomers, based on the total weight of propylene polymer material and grafting monomer used. Thereafter, simultaneously or successively in optional order, substantially all residual free radicals in the resultant grafted propylene polymer material are deactivated, and any unreacted monomers are removed from the material. The propylene polymer material is maintained in a substantially nonoxidizing environment, e.g., under an inert gas, throughout the process at least until after the deactivation of residual free radicals has been completed. The deactivation of free radicals preferably is accomplished by heating, e.g., at temperatures of at least 100° C., preferably at least 120° C., generally for at least 20 minutes.

The additive that is mixed with the graft copolymer to retard the depolymerization of PMMA is a hydroxylamine compound having the formula $T_1T_2NOH$, where $T_1$ is a 1 to 36 carbon alkyl group, a 5 to 12 carbon cycloalkyl group, a 7 to 9 carbon aralkyl group, or the aralkyl group substituted by a 1 to 4 carbon alkyl group or by one or two halogen atoms and $T_2$ is hydrogen or has the same meaning as $T_1$. Long chain N,N-dialkylhydroxylamines are preferred. A mixture of these long chain hydroxylamines is found in di(hydrogenated tallow)amine. The specific distribution of alkyl substituents may vary, but the di(hydrogenated tallow) amine contains major amounts of N,N-dihexadecylamine, N,N-dioctadecylamine and N-hexadecyl-N-octadecylamine.

The long chain N,N-dialkylhydroxylamines can be prepared by a number of methods. These include (a) the oxidation of the corresponding secondary amine with aqueous hydrogen peroxide to form the desired N,N-dialkylhydroxylamine directly; (b) the addition of a secondary amine to an α, β-unsaturated compound such as an alkyl acrylate to form a Michael addition product, which is in turn oxidized to the corresponding tertiary amine oxide using aqueous hydrogen peroxide, and followed by the elimination of the α, β-unsaturated compound by the Cope reaction to give the N,N-dialkylhydroxylamine; (c) the metathesis reaction between an alkyl halide and a hydroxylamine in the presence of alkali such as sodamide, and (d) the reaction of an amine with a peroxy compound, such as benzoyl peroxide, followed by saponification of the intermediate formed to the desired hydroxylamine derivative.

The hydroxylamine compound is present in amount of about 0.025 to about 5.0, preferably about 0.1 to about 2.5, parts per hundred parts of the graft copolymer. Suitable hydroxylamine compounds include, for example, oxidized bis(hydrogenated tallow alkyl) amines such as FS-042 hydroxylamine commercially available from Ciba-Geigy; Fiberstab 210 stabilizer, which is a blend of 50% FS-042 hydroxylamine and 50% Chimassorb 119 hindered amine (90% HALS A and 10% Tinuvin 622 hindered amine), also commercially available from Ciba-Geigy; dibenzyl hydroxylamine, and t-amyl-t-butylnitroxide. HALS A is 1,3,5-triazine-2,4,6-triamine, N, N'''-[1,2-ethane- diylbis[N-[4,6-bis[butyl(1,2,2,6,6-pentamethyl-4-piperidinyl)amino]-1,3,5-triazin-2- yl]amino]propyl]-[N',N''-dibutyl-N',N''-bis (1,2,2,6,6-pentamethyl-4-piperidinyl).

The graft copolymer can also be mixed with one or more polymeric materials such as, for example, polyolefin rubbers, a mixture of polyolefin rubber and a core-shell rubber, and broad molecular weight distribution propylene polymer materials (BMWD PP).

The polyolefin rubber is a copolymer or terpolymer of ethylene and one or two 3–10 C α-olefins, for example, ethylene/propylene, ethylene/butene, and ethylene/octene copolymer rubbers.

Core-shell rubbers comprise small particles of crosslinked rubber phase surrounded by a compatibilizing shell, normally a glassy polymer or copolymer. The core is typically a diene rubber such as butadiene or isoprene, or an acrylate. The shell is typically a polymer of two or more monomers selected from styrene, methyl methacrylate, and acrylonitrile. Particularly preferred core-shell rubbers have an acrylate core.

When the polyolefin rubber or the mixture of polyolefin rubber and core-shell rubber is added to the composition without BMWD PP, the rubber component is present in an amount of about 2% to about 40% and the graft copolymer is present in an amount of about 60% to about 98% by weight.

The BMWD propylene polymer material has a $M_w/M_n$ of 8 to 60, preferably 12 to 40; a melt flow rate of 0.5 to 50, preferably 3 to 30, g/10 min, and xylene insolubles at 25° C. of greater than or equal to 94, preferably greater than or equal to 96%, and most preferably greater than or equal to 98%. When both a rubber component and the BMWD PP material are present in the composition, the graft copolymer is present in an amount of about 20% to about 90%, the BMWD PP material is present in an amount of about 10% to about 70%, and the polyolefin rubber, or the mixture of polyolefin rubber and core-shell rubber, is present in an amount of about 2% to about 40% by weight.

The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD propylene polymer material can be prepared by sequential polymerization in at least two stages, in the presence of a Ziegler-Natta catalyst supported on magnesium halides, in active form. Fraction (A) and (B) are prepared in separate and consecutive stages, operating in each stage in the presence of the polymer and the catalyst coming from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD propylene polymer material is described in more detail in U.S. Pat. No. 5,286,791, the process of which is incorporated herein by reference.

If polymer additives are present in the composition, the amount of hydroxylamine compound is about 0.025 to about 5.0, preferably about 0.1 to about 2.5, parts per hundred, based on the total amount of polymer in the composition.

Other additives such as fillers, reinforcing agents, pigments, slip agents, waxes, oils, antiblocking agents, and antioxidants can also be present.

The hydroxylamine compounds are useful for retarding the depolymerization of PMMA at temperatures above the depolymerization temperature of PMMA, commonly reported in the literature as 250° to 275° C., i.e., during melt processing operations such as, for example, extrusion, molding, film production, fiber production, and thermoforming. Odor in the final product is also reduced.

In the following examples, the MMA content in the graft copolymer was determined by weighing 5 g of sample into a 50 ml serum vial, to which was added 25 ml of acetone. The vial was capped tightly and weighed. The sample vial was placed in an ultrasonic bath at room temperature and the sample was extracted for three hours. The sample vial was then removed from the bath, cooled if warm, and reweighed to determine leakage. Acetone was added to replace any loss in weight due to evaporation. One microliter of the sample was removed by syringe and analyzed using a gas chromatograph equipped with a $H_2$ flame ionization detector, temperature programming, and integration.

Melt flow rate was determined at 230° C. under a load of 3.2 kg according to ASTM method D-1238.

In this specification all parts and percentages are by weight unless otherwise noted.

EXAMPLE 1

This example shows the effect on the amount of monomer produced during melt processing when various radical scavengers (antioxidants) were added to a graft copolymer comprising a propylene homopolymer backbone, to which was grafted a methyl methacrylate/methyl acrylate copolymer. The amount of monomer introduced into the reactor was 91.4 parts of methyl methacrylate (MMA) and 3.6 parts of methyl acrylate (MA) per hundred parts of polypropylene. The % conversion of monomer to polymer was 96.1%.

The samples were compounded on a Brabender single-screw extruder equipped with a 3:1 compression, 25 L/D ratio screw. Each sample was extruded at a flat 220° C. profile at 60 rpm in an air atmosphere. The samples were transferred immediately after pelletization into sealed glass jars, and subsequently analyzed for MMA content. The results are given in Table 1.

In the table, BHT was butylated hydroxytoluene; Stabilizer 1 was Fiberstab 210 stabilizer, commercially available from Ciba-Geigy, a blend of 50% FS-042 oxidized bis (hydrogenated tallow alkyl) amines and 50% Chimassorb 119 hindered amine (90% HALS A and 10% Tinuvin 622 hindered amine). Stabilizer 2 was Irganox 1010 antioxidant, which is 2,2-bis[[3,5-bis(1,1-dimethylethyl)-4-hydroxyphenyl)]-1- oxopropoxy]methyl]-1,3-propanediyl-3,5-bis(1,1-dimethylethyl)-4-hydroxybenzenepropanoate, and is also commerically available from Ciba-Geigy.

TABLE 1

| Sample No. | 1 | 2 | 3 | 4 | 5 |
|---|---|---|---|---|---|
| Graft Copolymer | 100 | 100 | 100 | 100 | 100 |
| BHT | 0 | 0 | 0 | 1 | 0 |
| Stabilizer 1 | 0 | 0 | 0 | 0 | 0.5 |
| Stabilizer 2 | 0 | 0.1 | 1 | 0 | 0 |
| MMA (ppm) | 2,000 | 1,150 | 685 | 70 | 70 |

The data show that Fiberstab 210 stabilizer gave the best results, taking into consideration the amount of additive used.

EXAMPLE 2

The data in Table 2 show that FS-042 hydroxylamine was the component of Fiberstab 210 stabilizer (Stabilizer 1) that was responsible for the reduction in methyl methacrylate monomer. In the table, the hindered amine was Chimassorb 119 hindered amine (90% HALS A and 10% Tinuvin 622 hindered amine). The graft copolymer was the same as in Example 1.

TABLE 2

| Sample No. | 1 | 2 | 3 | 4 | 5 | 6 |
|---|---|---|---|---|---|---|
| Graft Copolymer | 100 | 100 | 100 | 100 | 100 | 100 |
| Ca stearate | 0.1 | 0.1 | 0.1 | 0.1 | 0.1 | 0.1 |
| Stabilizer 1 | 0.5 | 0.2 | 0 | 0 | 0 | 0 |
| Hydroxylamine | 0 | 0 | 0.25 | 0.1 | 0 | 0 |

TABLE 2-continued

| Sample No. | 1 | 2 | 3 | 4 | 5 | 6 |
|---|---|---|---|---|---|---|
| Hindered Amine | 0 | 0 | 0 | 0 | 0.25 | 0.1 |
| MFR, dg/min | 4 | 4.1 | 3.7 | 4.6 | 7.6 | 7.8 |
| MMA, ppm | 60 | 50 | 75 | 60 | 1,040 | 1,300 |

EXAMPLE 3

This example shows the effect of the processing temperature on the amount of MMA monomer that is produced during melt processing of a composition that contains Fiberstab 210 stabilizer, as well as a comparison with the amount of monomer formed at each temperature when Irganox B-215 antioxidant is used instead of Fiberstab 210 stabilizer.

The samples were compounded on a Haake twin-screw laboratory extruder equipped with counter-rotating screws. Each sample was extruded at six different temperatures: 220°, 240°, 260°, 280°, 300°, and 320° C. All samples were processed at 50 rpm in an air atmosphere. The samples were transferred immediately after pelletization into sealed glass jars and analyzed for MMA monomer content.

Table 3 shows the composition of each sample. The graft copolymer was the same as in Example 1. The broad molecular weight distribution propylene homopolymer (BMWD PP) had a polydispersity index of 7.4, a melt flow rate of 1 g/10 min (ASTM D-1238, 230° C., 2.16 kg), and xylene insolubles at 25° C. of 98.5%, and is commercially available from Montell USA Inc. The rubber was Engage 8150 ethylene/octene-1 copolymer, commercially available from Dow Chemical Company. Stabilizer 1 was Fiberstab 210 stabilizer, and Stabilizer 3 was Irganox B-215, a mixture of 1 part Irganox 1010 antioxidant and 2 parts Irgafos 168 tris(2,4-di-tert-butylphenyl) phosphite stabilizer, commercially available from Ciba Geigy. The amounts of the additives in Table 3 are given in parts per hundred, based on the total amount of polymer in the composition.

TABLE 3

| sample No. | 1 | 2 |
|---|---|---|
| Graft Copolymer | 45 | 45 |
| BMWD PP | 50 | 50 |
| Rubber | 5 | 5 |
| Ca stearate (ph) | 0.1 | 0.1 |
| Stabilizer 1 (pph) | 0.2 | 0 |
| Stabilizer 3 (pph) | 0 | 0.25 |

Table 4 shows the amount of monomer at various temperatures for each of the samples. The designation "nt" stands for "not tested".

TABLE 4

| Extrusion Temp., °C. | 220 | 240 | 260 | 280 | 310 | 320 |
|---|---|---|---|---|---|---|
| MMA, ppm (Sample 1) | 50 | 100 | 300 | 720 | 1,520 | 2,750 |
| MMA, ppm (Sample 2) | 80 | nt | nt | 2,770 | nt | 6,100 |

The data show that as the extrusion temperature was increased, the amount of MMA formed was much smaller when a hydroxylamine compound was present in the composition than when Irganox B-215 antioxidant was used.

EXAMPLE 4

This example shows the effect of using FS-042 hydroxylamine on the production of MMA monomer after melt processing of a graft copolymer comprising a propylene homopolymer backbone, to which was grafted poly(methyl methacrylate) or a copolymer of methyl methacrylate and methyl acrylate (MA) containing varying amounts of methyl acrylate comonomer.

Polymer 1 contained no MA comonomer and the % conversion of monomer to polymer was 96.1%. For Polymer 2, 90.8 parts of MMA and 4.2 parts of MA were introduced into the reactor per hundred parts of propylene homopolymer. The % conversion was 94.2%. For Polymer 3, 88.8 parts of MMA and 6.2 parts of MA were introduced into the reactor per hundred parts of propylene homopolymer. The % conversion was 96.6%. Stabilizer 2 was Irganox 1010 antioxidant, commercially available from Ciba-Geigy, and the hydroxylamine was FS-042 oxidized bis(hydrogenated tallow allkyl) amines, also commercially available from Ciba-Geigy. The amounts of the additives in the formulations are given in parts per hundred parts of polymer (pph).

Before melt processing, the MMA content of all of the polymers was measured after drying under standard conditions (140° F. for 12 hours). The graft copolymer was then compounded with the additives shown in Table 5 (parts by weight per 100 parts of the graft copolymer). All samples were compounded on a Brabender single-screw extruder equipped with a 3:1 compression, 25 L/D screw. The samples were extruded at a flat 260° C. profile at 60 rpm in an air atmosphere. The samples were transferred immediately after pelletization into sealed glass jars, and subsequently analyzed for MMA content. The % reduction in MMA was calculated from a comparison between the wt. % MMA after melt processing, with and without the hydroxylamine, i.e., a comparison of samples 1 and 2, 3 and 4, and 5 and 6. The results are given in Table 5.

TABLE 5

| Sample No. | 1 | 2 | 3 | 4 | 5 | 6 |
|---|---|---|---|---|---|---|
| Polymer 1 (no MA) | 100 | 100 | — | — | — | — |
| Polymer 2 (5 mole % MA) | — | — | — | — | 100 | 100 |
| Polymer 3 (7.5 mole % MA) | — | — | 100 | 100 | — | — |
| Ca stearate (pph) | 0.05 | 0.05 | 0.05 | 0.05 | 0.05 | 0.05 |
| Stabilizer 2 (pph) | 0.1 | — | 0.1 | — | 0.1 | — |
| Hydroxylamine (pph) | — | 0.1 | — | 0.1 | — | 0.1 |
| ppm MMA before melt processing | 19 | 19 | 20 | 20 | 28 | 28 |
| wt. % MMA after melt processing | 1.206 | 0.385 | 0.48 | 0.193 | 0.777 | 0.146 |
| % Reduction in MMA | — | 68 | — | 76 | — | 81 |

The data show that the use of the hydroxylamine significantly reduced the amount of monomer that was generated during melt processing.

EXAMPLE 5

This example demonstrates the effect of using varying amounts of hydroxylamine additive (parts per hundred, based on the total amount of polymer in the composition) on the MMA content of a graft copolymer alone and when mixed with polymer additives. The graft copolymer was a propylene homopolymer backbone, to which was grafted a methyl methacrylate/methyl acrylate copolymer. The amount of monomer introduced into the reactor was 90.8 parts of MMA and 4.2 parts of MA per hundred parts of polypropylene. The % conversion of monomer to polymer was 97.9%.

All samples were compounded on a Brabender single-screw extruder equipped with a 3:1 compression, 25 L/D ratio screw. The samples were extruded at a flat 260° C. profile at 60 rpm in an air atmosphere. The pellets were transferred to sealed glass jars and subsequently analyzed for residual MMA content. The results are given in Tables 6 and 7.

In Table 6, the base formulation was a mixture of 100 parts of the graft copolymer and 0.1 part calcium stearate (CaSt) per hundred parts of the graft copolymer. In Table 7, the base formulation was a mixuture of (1) 45 parts of the graft copolymer, (2) 50 parts of the broad molecular weight distribution propylene homopolymer used in Example 3, (3) 5 parts Engage 8150 ethylene/octene copolymer rubber, commercially available from Dow Chemical Company, and (4) 0.1 part calcium stearate per hundred parts of (1)+(2)+(3). The hydroxylamine was FS-042 hydroxylamine.

TABLE 6

| Hydroxylamine (pph) | MMA (ppm) |
|---|---|
| 0 | 8820 |
| 0.025 | 4230 |
| 0.1 | 1930 |
| 1 | 711 |

TABLE 7

| Hydroxylamine (pph) | MMA (ppm) |
|---|---|
| 0 | 4190 |
| 0.05 | 1150 |
| 0.1 | 890 |
| 0.25 | 640 |
| 0.5 | 270 |
| 1 | 360 |
| 5 | 510 |

EXAMPLE 6

This example demonstrates the effect of using various hydroxylamine compounds on the MMA content of a graft copolymer mixed with polymer additives. The graft copolymer was a propylene homopolymer backbone, to which was grafted a methyl methacrylate/methyl acrylate copolymer. The amount of monomer introduced into the reactor was 90.8 parts of MMA and 4.2 parts of MA per hundred parts of polypropylene. The % conversion of monomer to polymer was 94.2%.

The broad molecular weight distribution propylene homopolymer and the rubber were the same as in Example 3. Stabilizer 4 was FS-042 oxidized bis(hydrogenated tallow alkyl) amines, commercially available from Ciba-Geigy. Stabilizer 5 was dibenzyl hydroxylamine, and Stabilizer 6 was t-amyl-t-butylnitroxide.

All samples were compounded on a Brabender single-screw extruder equipped with a ¾" screw. The samples were extruded at a flat 260° C. profile at 60 rpm in an air atmosphere. The results are given in Table 8.

TABLE 8

| Sample No. | Control | 1 | 2 | 3 |
|---|---|---|---|---|
| Graft Copolymer | 45 | 45 | 45 | 45 |
| BMWD PP | 50 | 50 | 50 | 50 |
| Rubber | 5 | 5 | 5 | 5 |
| CaSt (pph) | .1 | .1 | .1 | .1 |
| Stabilizer 4 (pph) | — | .1 | — | — |
| Stabilizer 5 (pph) | — | — | .1 | — |

TABLE 8-continued

| Sample No. | Control | 1 | 2 | 3 |
|---|---|---|---|---|
| Stabilizer 6 (pph) | — | — | — | .1 |
| MMA (ppm) | 4190 | 574 | 2070 | 1987 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A composition comprising (1) a polymer material comprising a graft copolymer comprising a backbone of a propylene polymer material having graft polymerized thereto poly(methyl methacrylate) or a copolymer of methyl methacrylate and at least one comonomer, wherein the total amount of polymerized monomer is about 10 parts to about 120 parts per hundred parts of the propylene polymer material and the comonomer, when present, is present in an amount up to about 20 mol % of the total polymerized monomers, and (2) about 0.025 parts to about 5.0 parts of a hydroxylamine compound having the formula $T_1T_2NOH$, where $T_1$ is a 1 to 36 carbon alkyl group, a 5 to 12 carbon cycloalkyl group, a 7 to 9 carbon aralkyl group, or the aralkyl group substituted by a 1 to 4 carbon alkyl group or by one or two halogen atoms and $T_2$ is hydrogen or has the same meaning as $T_1$, per hundred parts of the polymer material.

2. The composition of claim 1, wherein the propylene polymer material of the graft copolymer is selected from the group consisting of:

(a) a homopolymer of propylene;
   (b) a random copolymer of propylene and an olefin selected from the group consisting of ethylene and $C_4$–$C_{10}$ α-olefins, provided that, when the olefin is ethylene, the maximum polymerized ethylene content is about 10% by weight, and when the olefin is a $C_4$–$C_{10}$ α-olefin, the maximum polymerized content thereof is about 20% by weight;
   (c) a random terpolymer of propylene and an olefin selected from the group consisting of ethylene and $C_4$–$C_8$ α-olefins, provided that the maximum polymerized $C_4$–$C_8$ α-olefin content is about 20% by weight, and, when ethylene is one of the olefins, the maximum polymerized ethylene content is about 5% by weight;
   (d) an olefin polymer composition consisting essentially of:
      (i) from 10% to 50% of a propylene homopolymer having an isotactic index preferably of 85% to 98%, or a copolymer selected from the group consisting of (a) propylene and ethylene, (b) propylene, ethylene and a $CH_2=CHR$ α-olefin, where R is a $C_{2-8}$ straight or branched alkyl group, and (c) propylene and an α-olefin as defined above in (i)(b);
      (ii) from 5% to 20% of a semi-crystalline, essentially linear copolymer fraction having a crystallinity of about 20% to 60%, by differential scanning calorimetry (DSC), wherein the copolymer is selected from the group consisting of (a) ethylene and propylene containing over 55% ethylene; (b) ethylene, propylene, and an α-olefin as defined above in (i)(b), containing from 1% to 10% of the α-olefin and over 55% up to 98% of both ethylene and α-olefin, and (c) ethylene and an α-olefin as defined in (i)(b), containing over 55% up to 98% of the α-olefin, which copolymer is insoluble in xylene at room or ambient temperature; and
      (iii) from 40% to 80% of a copolymer fraction selected from the group consisting of a copolymer of (a) ethylene and propylene wherein the copolymer contains from 20% to less than 40% ethylene; (b) ethylene, propylene, and an α-olefin as defined in (i)(b), wherein the α-olefin is present in an amount of from 1% to 10%, and the amount of ethylene and α-olefin present is from 20% to less than 40%; and (c) ethylene and an α-olefin as defined in (i)(b), containing from 20% to less than 40% of the α-olefin, and optionally with 0.5 to 10% of a diene, the copolymer fraction being soluble in xylene at ambient temperature, and having an intrinsic viscosity of from 1.7 to 3.0 dl/g, wherein the total amount of (ii) and (iii) fractions based on the total olefin polymer composition is from about 65% to 80%, the weight ratio of (ii)/(iii) is from 0.1 to about 0.3, and the total content of ethylene or $C_{4-8}$ α-olefin or combination thereof in (ii)+(iii) is less than 50%; and
   (e) a thermoplastic olefin consisting essentially of:
      (i) from 10% to 60% of a propylene homopolymer having an isotactic index greater than 90, or a crystalline propylene copolymer with ethylene and/ or a $C_{4-8}$ α-olefin having a propylene content greater than 85% and an isotactic index of greater than 85%;
      (ii) from 30% to 60% of an amorphous ethylene/ propylene copolymer fraction, optionally containing 0.5% to 10% of a diene, which is xylene soluble at room temperature, and contains from 40% to 70% ethylene; and
      (iii) from 8% to 40% of a semi-crystalline ethylene/ propylene copolymer that is xylene insoluble at room temperature.

3. The composition of claim 2, wherein the propylene polymer material is a propylene homopolymer.

4. The composition of claim 1, wherein the copolymer of methyl methacrylate is a copolymer of methyl methacrylate and methyl acrylate.

5. The composition of claim 1, wherein the hydroxylamine compound is an oxidized bis(hydrogenated tallow alkyl) amine.

6. The composition of claim 1, wherein the polymer material additionally comprises a polyolefin rubber and a broad molecular weight distribution polypropylene material having a $M_w/M_n$ of 8 to 60, a melt flow rate of 0.5 to 50 g/10 min, and xylene insolubles at 25° C. of greater than or equal to 94%.

7. The composition of claim 6, wherein the broad molecular weight distribution propylene polymer material is a broad molecular weight distribution propylene homopolymer.

8. A process for retarding the depolymerization of poly (methyl methacrylate) that has been graft polymerized onto a backbone of propylene polymer material, the process comprising mixing about 0.025 parts to about 5.0 parts of a hydroxylamine compound having the formula $T_1T_2NOH$, where $T_1$ is a 1 to 36 carbon alkyl group, a 5 to 12 carbon cycloalkyl group, a 7 to 9 carbon aralkyl group, or the aralkyl group substituted by a 1 to 4 carbon alkyl group or by one or two halogen atoms and $T_2$ is hydrogen or has the same meaning as $T_1$, per hundred parts of a polymer material comprising a graft copolymer comprising a backbone of a propylene polymer material having graft polymerized thereto poly(methyl methacrylate) or a copolymer of methyl methacrylate and at least one other monomer, wherein the total amount of polymerized monomer is about 10 parts to about 120 parts per hundred parts of the propylene polymer material and the comonomer, when present, is present in an amount up to 20 mol % of the total polymerized monomers.

9. The process of claim 8 wherein the propylene polymer material of the graft copolymer is selected from the group consisting of:

(a) a homopolymer of propylene;

(b) a random copolymer of propylene and an olefin selected from the group consisting of ethylene and $C_4$–$C_{10}$ ($\alpha$-olefins, provided that, when the olefin is ethylene, the maximum polymerized ethylene content is about 10% by weight, and when the olefin is a $C_4$–$C_{10}$ $\alpha$-olefin, the maximum polymerized content thereof is about 20% by weight;

(c) a random terpolymer of propylene and an olefin selected from the group consisting of ethylene and $C_4$–$C_8$ $\alpha$-olefins, provided that the maximum polymerized $C_4$–$C_8$ $\alpha$-olefin content is about 20% by weight, and, when ethylene is one of the olefins, the maximum polymerized ethylene content is about 5% by weight;

(d) an olefin polymer composition consisting essentially of:

(i) from 10% to 50% of a propylene homopolymer having an isotactic index preferably of 85% to 98%, or a copolymer selected from the group consisting of (a) propylene and ethylene, (b) propylene, ethylene and a $CH_2$=CHR $\alpha$-olefin, where R is a $C_{2-8}$ straight or branched alkyl group, and (c) propylene and an $\alpha$-olefin as defined above in (i)(b);

(ii) from 5% to 20% of a semi-crystalline, essentially linear copolymer fraction having a crystallinity of about 20% to 60%, by differential scanning calorimetry (DSC), wherein the copolymer is selected from the group consisting of (a) ethylene and propylene containing over 55% ethylene; (b) ethylene, propylene, and an $\alpha$-olefin as defined above in (i)(b), containing from 1% to 10% of the $\alpha$-olefin and over 55% up to 98% of both ethylene and $\alpha$-olefin, and (c) ethylene and an $\alpha$-olefin as defined in (i)(b), containing over 55% up to 98% of the $\alpha$-olefin, which copolymer is insoluble in xylene at room or ambient temperature; and (iii) from 40% to 80% of a copolymer fraction selected from the group consisting of a copolymer of (a) ethylene and propylene wherein the copolymer contains from 20% to less than 40% ethylene; (b) ethylene, propylene, and an $\alpha$-olefin as defined in (i)(b), wherein the $\alpha$-olefin is present in an amount of from 1% to 10%, and the amount of ethylene and $\alpha$-olefin present is from 20% to less than 40%; and (c) ethylene and an $\alpha$-olefin as defined in (i)(b), containing from 20% to less than 40% of the $\alpha$-olefin, and optionally with 0.5 to 10% of a diene, the copolymer fraction being soluble in xylene at ambient temperature, and having an intrinsic viscosity of from 1.7 to 3.0 dl/g, wherein the total amount of (ii) and (iii) fractions based on the total olefin polymer composition is from about 65% to 80%, the weight ratio of (ii)/(iii) is from 0.1 to about 0.3, and the total content of ethylene or $C_{4-8}$ $\alpha$-olefin or combination thereof in (ii)+(iii) is less than 50%; and (e) a thermoplastic olefin consisting essentially of:

(i) from 10% to 60% of a propylene homopolymer having an isotactic index greater than 90, or a crystalline propylene copolymer with ethylene and/or a $C_{4-8}$ $\alpha$-olefin having a propylene content greater than 85% and an isotactic index of greater than 85%;

(ii) from 30% to 60% of an amorphous ethylene/propylene copolymer fraction, optionally containing 0.5% to 10% of a diene, which is xylene soluble at room temperature, and contains from 40% to 70% ethylene; and (iii) from 8% to 40% of a semi-crystalline ethylene/propylene copolymer that is xylene insoluble at room temperature.

10. The process of claim 8, wherein the propylene polymer material is a propylene homopolymer.

11. The process of claim 8, wherein the methyl methacrylate copolymer is a copolymer of methyl methacrylate and methyl acrylate.

12. The process of claim 8, wherein the hydroxylamine compound is an oxidized bis(hydrogenated tallow alkyl) amine.

13. The process of claim 8, wherein the polymer material additionally comprises a polyolefin rubber and a broad molecular weight distribution polypropylene material having a $M_w/M_n$ of 8 to 60, a melt flow rate of 0.5 to 50 g/10 min, and xylene insolubles at 25° C. of greater than or equal to 94%.

* * * * *